US009845152B2

(12) United States Patent
Stan

(10) Patent No.: US 9,845,152 B2
(45) Date of Patent: Dec. 19, 2017

(54) APPARATUS AND METHOD FOR PROVIDING CONTROL AND AUGMENTING THRUST AT REDUCED SPEED AND ENSURING REDUCED DRAG AT INCREASED SPEED

(71) Applicant: Dusan Milivoi Stan, Stoney Creek (CA)

(72) Inventor: Dusan Milivoi Stan, Stoney Creek (CA)

( * ) Notice: Subject to any disclaimer, the term of this patent is extended or adjusted under 35 U.S.C. 154(b) by 185 days.

(21) Appl. No.: 14/818,202

(22) Filed: Aug. 4, 2015

(65) Prior Publication Data

US 2017/0036760 A1    Feb. 9, 2017

(30) Foreign Application Priority Data

Aug. 11, 2014  (CA) ..................................... 2859258

(51) Int. Cl.
| | | |
|---|---|---|
| *B64C 15/00* | (2006.01) | |
| *B64C 29/00* | (2006.01) | |
| *B64C 11/00* | (2006.01) | |
| *B64D 33/02* | (2006.01) | |
| *B64C 15/02* | (2006.01) | |
| *B63H 5/15* | (2006.01) | |

(52) U.S. Cl.
CPC .......... *B64C 29/0033* (2013.01); *B63H 5/15* (2013.01); *B64C 11/001* (2013.01); *B64C 15/02* (2013.01); *B64D 33/02* (2013.01)

(58) Field of Classification Search
CPC .... B64C 29/0033; B64C 27/20; Y02T 50/145
USPC .......................................................... 244/51
See application file for complete search history.

(56) References Cited

U.S. PATENT DOCUMENTS

| | | | | |
|---|---|---|---|---|
| 3,335,977 | A * | 8/1967 | Meditz ..................... | B64C 3/42 244/12.4 |
| 9,085,355 | B2 * | 7/2015 | DeLorean ........... | B64C 29/0033 |
| 2010/0051740 | A1 * | 3/2010 | Yoeli ................... | B64C 29/0033 244/12.1 |
| 2014/0158816 | A1 * | 6/2014 | DeLorean ........... | B64C 29/0033 244/12.4 |

* cited by examiner

*Primary Examiner* — Richard G Davis

(57) ABSTRACT

The invention provides a fluid propulsion augmentation arrangement and method, capable of also generating control moments (23), providing increased thrust (45) at reduced speed, reduced drag at increased speed, under conditions in which traditional approach cannot provide sufficient performance. It consists of a wing (10) located in a propulsion system (11) fluid intake region (13), having a slanted trailing edge (16) coinciding with a fraction of the propulsion intake (17), pivotally connected (14), allowing position adjustments. At reduced speed, the wing (10) and the propulsion system intake (17) are placed adjacently, the intake low pressure determines wing (10) fluid-dynamic force (44) generation. Increasing speed, wing (10) position varies, following fluid stream (15) convergence change, maintaining an angle of attack for increased L/D, ensuring increased performance, and also varying control moments (23).

18 Claims, 5 Drawing Sheets

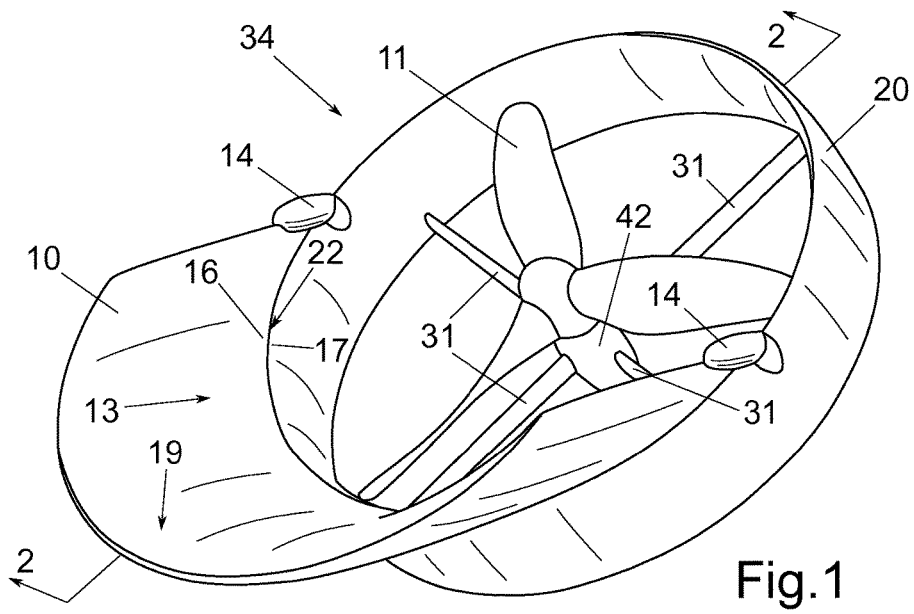
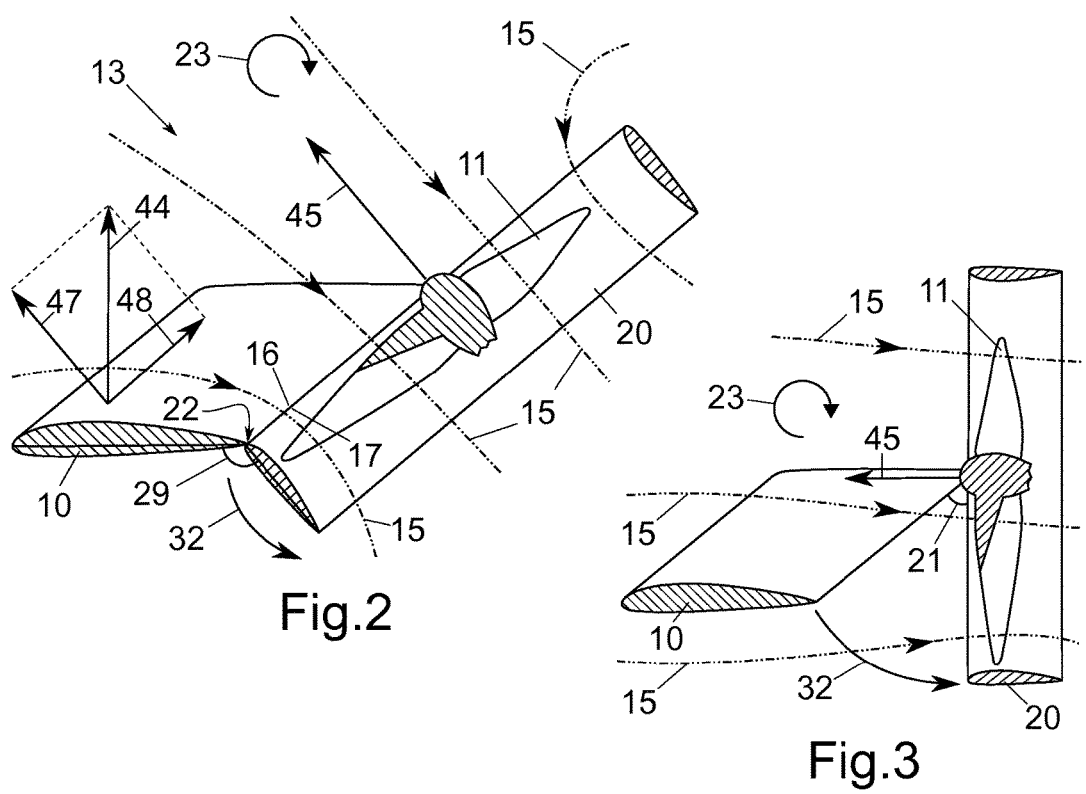
Fig.1
Fig.2
Fig.3

APPARATUS AND METHOD FOR PROVIDING CONTROL AND AUGMENTING THRUST AT REDUCED SPEED AND ENSURING REDUCED DRAG AT INCREASED SPEED

The present application is a continuation and improvement of Canadian patent application No. 2,859,258 filed Aug. 11, 2014.

This invention relates generally to aircraft and watercraft propulsion, more particularly to an apparatus and method for generating fluid-dynamic forces, for augmenting propulsion, creating moments providing directional control to said craft, generating increased thrust at reduced speed, ensuring reduced drag at increased speed.

BACKGROUND

There are a lot of devices that enhance lift generated by a wing at reduced speed, as slats, slots, flaps, but generally they do not provide any lift at zero aircraft speed. There are also well known vertical or short take off and landing (V/STOL) craft that adopts several methods for generating lift during VTOL operation, but each of them has certain disadvantages.

The most known hovering craft is the helicopter; to create lift it employs a rotor, that in order to achieve high efficiency in hover mode, it has a low disc loading, invariably leading to a large rotor, creating difficulties as the helicopter speed increases, such as retreating blade stall, high drag and loss of efficiency, making the helicopters unsuitable to operate at higher speed. A method to combat these deficiencies are employed by tilted rotor and tilted wing aircraft, such as Bell Boeing V-22 Osprey and Canadair CL-84. Their design is a compromise between hovering configuration efficiency, having higher disk loading than helicopters, and horizontal configuration efficiency, having more propeller disk that they need for generating forward thrust, resulting in more drag, compared to fixed wing aircraft. Another approach to eliminate retreating blade stall and to increase speed of a helicopter is employed by the compound helicopter, such as Piasecki X-49 and Eurocopter X3. This approach involves unloading the rotor disk at high speed, lift being provided partially by small wings, and having forward thrust provided by an auxiliary propulsion system. Although this method increases maximum speed of the compound helicopter, efficiencies, both in hovering and in forward flight, are reduced, because in each mode, there is an extra system, contributing little to the operation, leading to increased weight and drag.

Static lift generated by a propeller or fan is increased, if the propeller is enclosed into a shroud or a duct, tip losses are reduced, the shroud intake provides itself thrust, but although a shrouded propeller creates more static thrust, the drag created by the shroud becomes prohibitive as speed increases, and above a certain breakeven speed, the efficiency drops below of that provided by an open air propeller. A shroud optimized for high static thrust have a large bell shaped inlet, creating increased amount of drag, inherently inefficient at increased speed. An VTOL craft employing shrouded propellers to achieve VTOL flight is the experimental Bell X-22, but unable to achieve it's goal, the required maximum speed. Aircraft having shrouds optimized for high static trust are the Hiller VZ-1 Pawnee and the SoloTrek XFV. They were designed to operate exclusively in hover mode, inherently having a reduced transport efficiency.

Channel (Custer) wing type aircraft, as the CCW-5, have wings able to create lift at reduced speed, some test have shown they create an amount of lift even at zero speed. NACA tests of a channel winged aircraft shows less than 10% total thrust increase and lack of control at slow speed. It also suffers from vibration problems because the propeller blades have different loading in the proximity of the channel versus the open air.

In marine application, there are also devices augmenting propulsion system, but each of them are having certain disadvantages. Devices for increasing propeller thrust, as Kurt nozzles or accelerating ducts, are functioning optimum in certain conditions and designed speed. Major disadvantages are increased drag and cavitation as boat speed increases, and decreased efficiency. Debris and ice can be jammed between the propeller and the nozzle, and are much more difficult to clear than open propellers. Another type of devices used for augmenting propulsion are the decelerating ducts, used for reducing cavitation and noise, for high speed applications. They have certain disadvantages as well, the biggest disadvantage is efficient operation around a limited speed range, reduced thrust, increased drag and decreased efficiency. Debris and ice can be jammed between the propeller and the nozzle as well, the same as for Kurt nozzles.

There is a definite need for improvement, a need for a system that augments thrust and provides control at reduced speed, yet ensuring low drag at increased speed.

SUMMARY

It is an object of one or more aspects of the invention to provide craft directional control and propulsion augmentation arrangement and method which is effective at low and zero speed, and ensure low drag at increased speed.

It is a further object of one or more aspects of the invention to provide such an arrangement and method specifically for attitude control and thrust augmentation, in order to provide V/STOL operation capability and aircraft manoeuvrability without affecting high speed performance of the aircraft.

Another object of one or more aspects of the invention is to provide such an arrangement and method specifically for efficiently augmenting thrust, to improve control and acceleration, at slow or zero speed, and improving high speed performance of the craft, used for watercraft and aircraft.

These objects are accomplished by providing a wing, located in a propulsion system fluid intake region. The relative position between the wing and the propulsion system intake can be varied, determining how the intake fluid stream is perturbed and consequently varying direction and magnitude of a fluid-dynamic force generated by the wing, determining craft moments variation, providing directional control, and augmenting propulsion.

The wing is having a slanted trailing edge coinciding with a fraction of the propulsion system intake, so the propulsion system intake can be placed at a predetermined angle, designed so to optimize certain parameters.

The wing and the propulsion system are connected using a joint, allowing adjustment in their relative position. For varying the relative position of the lip wing and the propulsion system, a mechanical linkage or an actuator is employed, controlled manually or by a computerized system, configured to vary the relative position as function of data received from input devices, to control the craft attitude, and control the augmentation of the propulsion system.

At zero or slow speed, the wing and the propulsion system intake are placed adjacently, the intake fluid stream is accelerated creating a low pressure area, influencing the wing so it generates the fluid-dynamic force augmenting thrust and creating control moments for adjusting craft attitude.

As speed increases, the wing and the propulsion system position is varied such as the wing and the propulsion system are disturbing less the fluid stream, the wing follows the fluid stream convergence, maintaining such an angle of attack to ensure increased lift per drag ratio, varying the wing's generated fluid-dynamic force and determining changes in control moments for adjusting craft attitude.

At high speed, the wing and the propulsion system are positioned approximately parallel to the fluid stream, so as to reduce their effect on the drag of the craft. The wing as described is further referred as the lip wing.

Accordingly several advantages of one or more aspects of the invention are as follows: capability to provide efficiently high thrust, to improve acceleration, to provide increased static thrust for watercraft and aircraft, and to improve hovering efficiency for V/STOL aircraft in vertical flight regime. Other objects and advantages are to also ensure low drag at increased speed, improve transport efficiency, reduce fuel consumption and allow a smaller installed power for the craft. Other objects and advantages are the ability to provide directional and attitude craft control, reducing or eliminating need for dedicated control surfaces, and to augment and control the propulsion system generated thrust.

Other objects and advantages are: reduced cavitation and noise; the wings can act as a pair of rudders; total drag is comparable to a standard propeller and rudder combination; ability of the system to be adjustable, at slow speed creating more thrust, improving acceleration or pull, at high speed having reduced drag and cavitation; the propeller is protected and prevented to hit bottom or foreign objects; ensured ability to easily clean debris from a fouled propeller.

Further objects and advantages will become apparent from a consideration of the drawings and ensuing description.

| Drawings Reference Numerals |
|---|
| 10 - lip wing; |
| 10' - blended wing |
| 11 - propeller; |
| 13 - intake region; |
| 14 - articulation; |
| 14' - bracket; |
| 15 - fluid stream; |
| 16 - slanted trailing edge; |
| 17 - inlet; |
| 18 - propeller perimeter; |
| 19 - wing curvature; |
| 20 - shroud; |
| 21 - control angle; |
| 22 - streamlined surface; |
| 23 - control moment; |
| 24 - actuator; |
| 25 - computerized system; |
| 26 - input device; |
| 27 - main pilot control device; |
| 28 - fluid speed sensor; |
| 29 - slant angle; |
| 30 - canopy; |
| 31 - struts; |
| 32 - pivoting direction; |
| 33 - reduced drag position; |
| 34 - main assembly; |
| 35 - conventional wing; |
| 36 - control surfaces; |

| -continued |
|---|
| Drawings Reference Numerals |
| 37 - fuselage; |
| 38 - auxiliary propeller; |
| 39 - canard wings; |
| 40 - control slats; |
| 41 - vertical stabilizer; |
| 42 - engine nacelle; |
| 43 - wing-let; |
| 44 - fluid dynamic force; |
| 45 - thrust; |
| 46 - vertical axis; |
| 47 - axial component; |
| 48 - transversal component; |
| 49 - yaw control moment; |
| 50 - stabilizer; |
| 51 - vertical component; |
| 52 - pitch control moment; |
| 53 - roll control moment; |
| 56 - wing hub; |

LIST AND DESCRIPTION OF DRAWINGS

FIG. 1 is a perspective view of the lip wing apparatus configured for high thrust operation;

FIG. 2 is a sectional side view of the lip wing apparatus configured for high thrust operation;

FIG. 3 is a sectional side view of the lip wing apparatus, low drag configuration;

THEORY OF OPERATION

Figure 4:
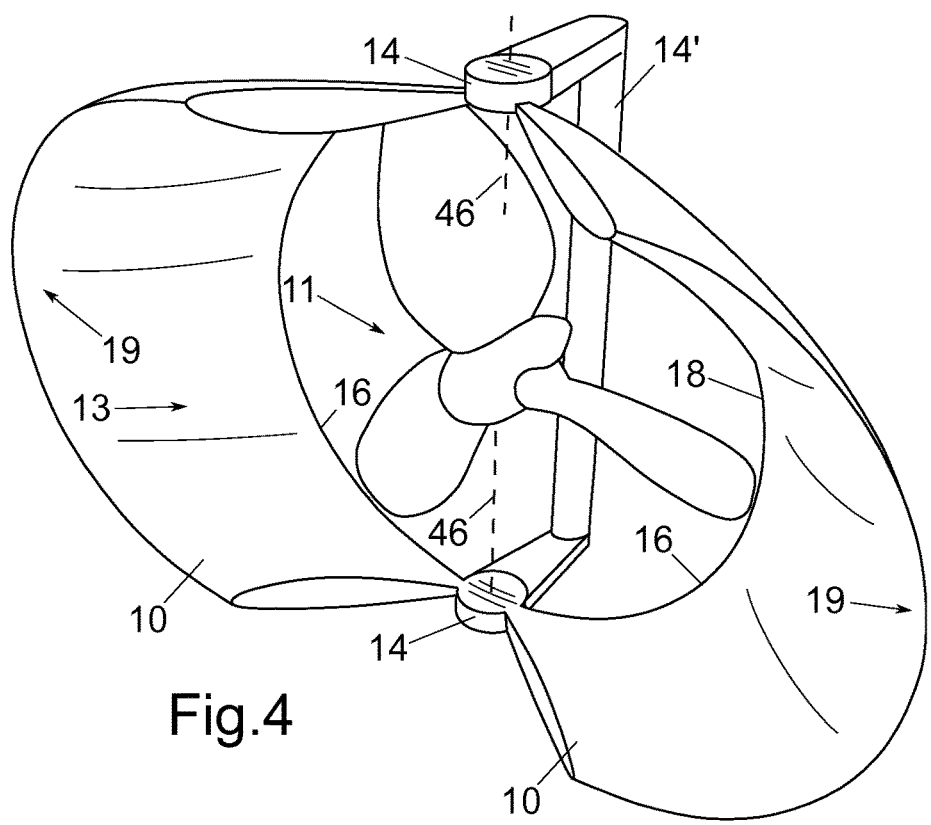
FIG. 4 is a perspective view of a system having two lip wings, configured for high thrust operation.

The phenomenon of fluid-dynamic force generation by a wing placed in the intake stream of a propulsion system, such as a propeller or fan, and the effect of the wing exerted on the propulsion thrust have several views or explanations.

A particular view regards pressure distribution around the system formed by the propeller and the wing. A propeller producing thrust can be viewed as an infinitely thin disk creating a pressure difference between it's sides. The amount of thrust created is equal to the area of the disk, multiplied by the average pressure difference. At the edge of the disk the fluid passes from the high pressure side to the low pressure side, reducing pressure difference and efficiency. The addition of the wing creates a separation between the high and low pressure areas, impeding some of the fluid passage, increasing the average pressure difference and resulting in more thrust being produced. Some of the pressure difference act on the wing as well, so it is generating a fluid-dynamic force. Modifying the relative position of the wing and the propeller, is determining changes in the direction and magnitude of the generated force, enabling directional and thrust control. The total system thrust is a resultant of vector addition between the already increased propeller thrust and the wing generated force.

Another view involves Newton's third principle; by accelerating a mass of fluid in one direction, thrust is created in the opposite direction. The amount of generated thrust is equal to fluid mass multiplied by acceleration. Although same thrust magnitude can be produced by a small acceleration of a large mass of air, or a large acceleration of a small mass of air, a small acceleration of a large mass of air is much more efficient, requiring less power, as the kinetic energy transmitted to the air is proportional to the squared speed. Most of the accelerating fluid molecules are in front of the propeller, in the intake region. Because molecules in a fluid are interacting with each other, the acceleration vector also have a side-wise component, more pregnant on molecules situated further from the propeller axis, receiving kinetic energy, but contributing less to the thrust. The molecules situated outside the propeller perimeter are even accelerated forward, diminishing produced thrust. Addition of the wing in the intake region, in certain conditions, impedes side-wise and forward acceleration of some molecules, and forcing more molecules, a larger mass of fluid, to be accelerated in the same general direction, increasing efficiency and contributing to the thrust.

Another particular view, well-known to the art, extensively used to predict and calculate fluid-dynamic forces generated by wings, is given by the mathematical model of circulation or Kutta-Joukowski theorem: generated wing lift is proportional to wing circulation multiplied by free-stream velocity. Unfortunately the Kutta-Joukowski theorem is ill suited to model the lift generated by an airfoil placed in the intake stream of a propulsion system. As defined, the theorem is valid for uniform stream condition, and needs to be amended to correctly predict the lift generated by a wing subjected to a convergent intake stream of a propulsion system.

DETAILED DESCRIPTION

A first embodiment is presented in FIG. 1, FIG. 2 and FIG. 3. A perspective view of the apparatus for providing craft control and augmenting propulsion, configured for providing high thrust is shown in FIG. 1. It shows a propeller or fan 11, mounted inside a shroud or duct 20 creating what is known in the art as a shrouded or ducted propeller or fan. The shroud 20 is having an intake region or region of disturbed aspirated fluid 13. A wing or an airfoil shaped body 10 is located in the intake region 13. An engine, not shown, rotates and provides power to the propeller 11, housed in an engine nacelle 42. Struts 31 provide support structure to the shroud 20.

The shroud 20 is exhibiting an inlet or a leading edge 17. The wing 10 is having a trailing edge 16 coinciding, matching a fraction of the inlet 17. The trailing edge 16 is slanted, to allow adjacent placement of the shroud 20, forming a certain angle. The wing 10 placed adjacently to the inlet 17, creates a lip or a bell shaped, smooth and aerodynamic streamlined surface 22, enlarges the surface area, and changes the geometry of the inlet 17 so to accelerate more of the fluid flow. The surface 22 is exposed to low pressure, high speed stream of fluid, the same as the top surface of any regular wing, so it have the same properties. The lip wing 10 exhibits a curvature 19, to geometrically account for the shape of the slanted trailing edge 16, to provide a lower front profile for the wing 10, reducing drag at high speed, and also to form a fore and aft channel, to contain and direct, and to better capture the effect of the fluid stream accelerating towards the inlet 17. The wing 10 as described, is further referred as the lip wing 10.

The shroud 20, the propeller 11, struts 31 and engine nacelle 42 are connected together, forming a main assembly 34. The lip wing 10 and the main assembly 34 are connected using aerodynamically shaped pivoting articulations or joints, 14, to allow adjustment in their relative position. A mechanism for controlling the rotation of the articulations 14, such as a mechanical linkage or an actuator, is not shown, such devices are well known to the art. Sectioning plane and viewing direction 2 is also shown.

FIG. 2 shows a sectional side view of the first embodiment, configured for high thrust. The support struts, engine and engine nacelle are not shown. At the intake region 13, aspirated by the propeller 11, a fluid stream or flow 15 enters the shroud 20. The streamlined surface 22, created by adjacently placing the slanted trailing edge 16 of the lip wing 10 to the inlet 17 fraction, is visible. The lip wing 10 and shroud 20 chords are forming a slant angle 29. The wing 10 disturbs the fluid flow 15 and creates a fluid-dynamic force 44.

A thrust or propulsive force 45 is generated by the propeller 11. The fluid-dynamic force 44 is vectorially decomposed into two components, one along the thrust 45 direction, resulting in an axial component or vector 47, and the other along a transverse direction, resulting in a transversal component or vector 48. The axial component 47 augments the thrust 45, the transversal component 48 could in certain conditions to create or augment a control moment 23.

An arrow 32 shows the pivoting direction of the shroud 20 to reduce the disturbance of fluid stream 15 by the lip wing 10, consequently reducing drag.

FIG. 3 shows a side sectional view of the first embodiment, configured for low drag. The support struts and engine are not represented. The lip wing 10 and the shroud 20 are positioned approximately parallel to the fluid stream 15, to ensure low drag. Pivoting the shroud 20 in the direction shown by the arrow 32 modifies a control angle 21 and the direction of the thrust 45, created by the propeller 11, consequently modifying the control moment 23.

Operation

FIG. 2 shows the system configured for generating high thrust, configuration obtained by controlling the control angle 21, and pivoting the shroud 20, and placing the inlet fraction 17 adjacently to the slanted trailing edge 16 of the lip wing 10. This configuration is highly efficient at slow or zero speed, as the lip wing affects highly the fluid stream 15 acceleration, as explained in the theory of operation.

As speed increases, beside creating an increased drag force, not shown, it determine a reduction of thrust 45 augmentation, caused by the fluid stream 15 speed increase for which the position of the shroud 20 is no longer adequate. The shroud 20 is pivoted, by controlling the control angle 21, in the direction shown by the arrow 32, to maintain an adequate position, correlated to the increased fluid speed, increasing thrust augmentation, and reducing drag.

As speed is increased further, the shroud 20 is pivoted more, as previously described, until reaching the position depicted in FIG. 3. In this position the lip wing 10 and the shroud 20, have less influence on fluid stream 15, having reduced angles of attack, and are generating reduced drag.

By controlling the control angle 21, and pivoting the shroud 20, the control moment 23 is modified, capable of providing attitude control to the craft.

System Design

During design, an aircraft could be provided with one or more lip wings, either located and sharing the intake of one propulsion system, or located at the intake of separate propulsion systems. Lip wing thrust augmentation experiments are showing 65% thrust increase of a lip wing system versus a similar dimension open propeller, and 20% thrust increase of a lip wing system versus a similar dimension shrouded propeller. Depending on the location of the lip wings, in respect to the centre of gravity, or the craft's centre of dynamic pressure, the generated fluid-dynamic forces could be varied differentially, to create or augment one or more control moments, consequently to control the attitude of the craft. Further details of control dynamics are well known to the art.

Lip Wing Geometry

Increasing the chord of the lip wing is effectively increasing it's surface area, and cause it to generate an increased amount of force. Increasing the lip wing's chord is effective up to a point because the leading edge of the wing is subjected less and less to the effect of the intake fluid stream. Aircraft weight, wing loading, induced and skin drag, and other considerations could affect the lip wing dimensioning decision.

The lip wing trailing edge slant angle determines also the force generated by the lip wing. The slant angle is calculated as function of fluid convergence, fluid speed, fluid density and temperature, propeller dimensions, geometry and power applied, shroud and lip wing dimensions and airfoil geometry. The geometry of the whole assembly is calculated to increase some goal parameters, as efficiency of the craft at cruise speed correlated to hovering efficiency, or lift per drag ratio in a certain speed range.

The control angle relationship to fluid speed. The intake fluid stream have a high convergence at slow speed, in other words, the side-wise speed of fluid particles located further from axis is high, converging towards the intake. The lip wing lift per drag ratio, L/D, is dependant on the angle of attack, and has an increased value for a specific angle of attack depending on the airfoil geometry. As the intake stream speed increases, the fluid stream convergence becomes lower, decreasing the angle of attack of the wing and decreasing the L/D of the wing. The control angle is changed, pivoting the wing to follow the fluid stream convergence change, to maintain an adequate angle of attack to ensure increased L/D.

Description of a System for Augmenting Propulsion and Providing Yaw Control for a Watercraft Another particular embodiment is a system for augmenting propulsion and providing yaw control for a watercraft, air-boat, hovercraft or ship. The system can be designed for conventional boats, having water immersed propellers, the working fluid being water, or it can be designed for air-boats and hovercrafts, having air propellers. The system is presented in FIG. 4 and FIG. 5.

FIG. 4 presents a perspective view of the system. The system is having two lip wings 10, located in an intake region 13 of a propeller 11. The lip wings 10 are having similar parts and properties, as defined in the first embodiment. The system have two vertical pivoting articulations or joints 14 for independently pivoting the lip wings 10 on vertical axis 46. A bracket or similar support structure 14' provide rigidity and support for connected elements. The powering method of the propeller 11, as an engine or a shaft, is not shown. Also not shown are mechanisms for controlling the rotation of the articulations 14, such as mechanical linkages or actuators, those devices are well known to the art.

The propeller 11 is having an outside circular perimeter or circumference 18, delimiting the intake region 13. Each of the lip wings are having a slanted trailing edge 16 substantially coinciding with a fraction of the perimeter 18, and consequently having a circular arc shape. Each of the lip wings 10 are exhibiting a curvature 19, to geometrically account for the circular arc shape of the slanted trailing edge 16, and consequently forming a fore and aft channel.

Figure 5:
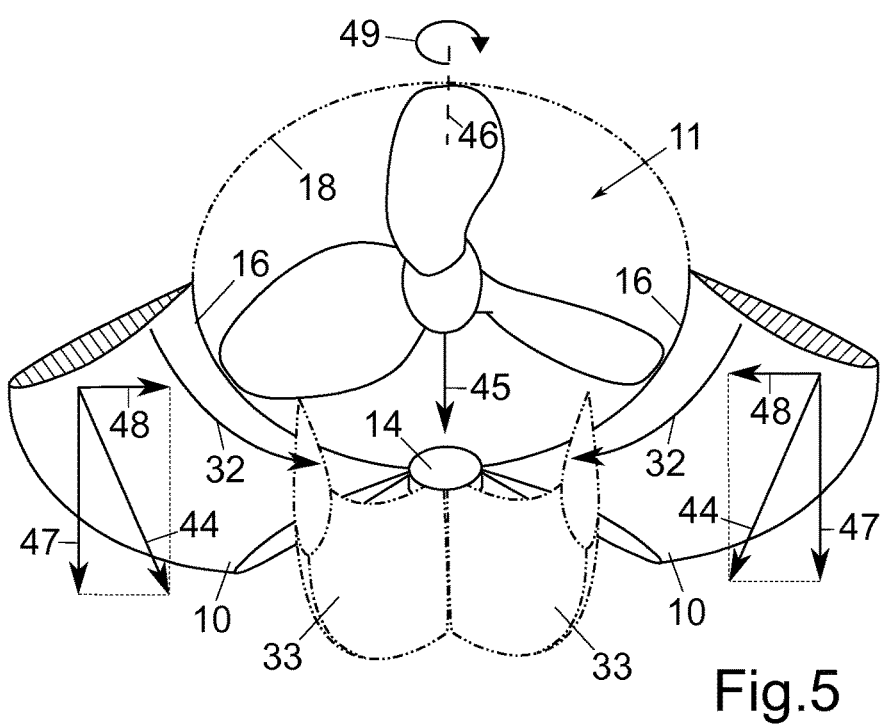
FIG. 5 is a perspective sectional front view of the system having two lip wings.

FIG. 5 is a front perspective sectional view of the system presented in FIG. 4. At slow speed, each of the lip wings 10 are pivoted, using articulation 14, and positioned with the slanted trailing edge 16 adjacently to the perimeter 18 of the propeller 11. Each of the lip wings 10 is disturbing fluid flow and generating fluid-dynamic forces 44. The propeller 11 is generating a thrust force 45. Each of the force generated by the lip wings 10, is vectorially decomposed into two components, one along the thrust 45 direction, resulting in axial components 47, and another one along a transverse direction, resulting in transversal components 48. By asymmetrically pivoting the lip wings 10 in respect to propeller 11, the direction and magnitude of the forces 44 are varied, so the transversal components 48, having different magnitudes, are creating a yaw control moment 49. When the speed is increased, the wings are pivoted as indicated by arrows 32, until reaching a reduced drag position 33.

Operation of the System for Augmenting Propulsion and Providing Yaw Control for a Watercraft At zero or slow speed, the lip wings are pivoted so their slanted trailing edge 16 is positioned adjacently to the perimeter 18 of the propeller 11, to enhance the effect of the fluid flow and increase augmentation of the thrust 45 by the fluid-dynamic forces 44. Pivoting and positioning symmetrically each lip wing 10, relative to the propeller 11, determine the transversal components 48 to have the same magnitude, but opposite direction, so they cancel each other. Each of the axial components 47 are adding to the thrust 45, augmenting it.

Steering or yaw control is accomplished by pivoting differentially the lip wings 10 in respect to the propeller 11, differentially modifying transversal components 48, consequently modifying the yaw control moment 49.

As speed increases, the lip wings 10 are pivoted towards a more adequate position, increasing lift per drag ratio, as presented in the first embodiment. Reduced drag is achieved by pivoting the lip wings into positions 33, as presented in the first embodiment. Yaw control is ensured by using lip wings 10 as rudders, modifying yaw control moment 49.

Description of a Single Lip Wing V/STOL Aircraft

Figure 6:
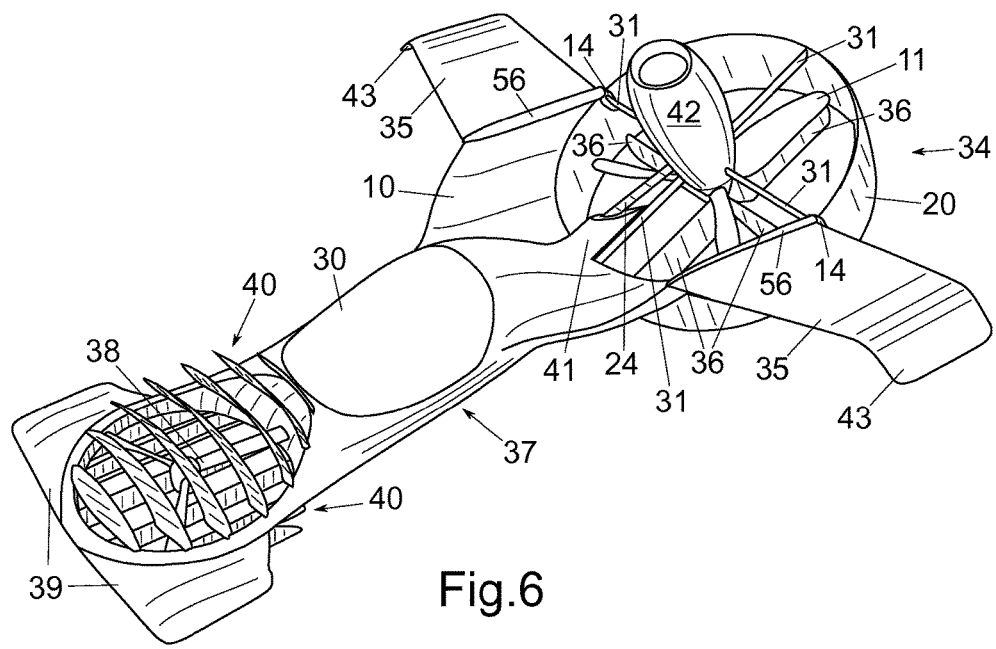
FIG. 6 is a perspective view of a single lip wing system aircraft configured for V/STOL operation.
Figure 7:
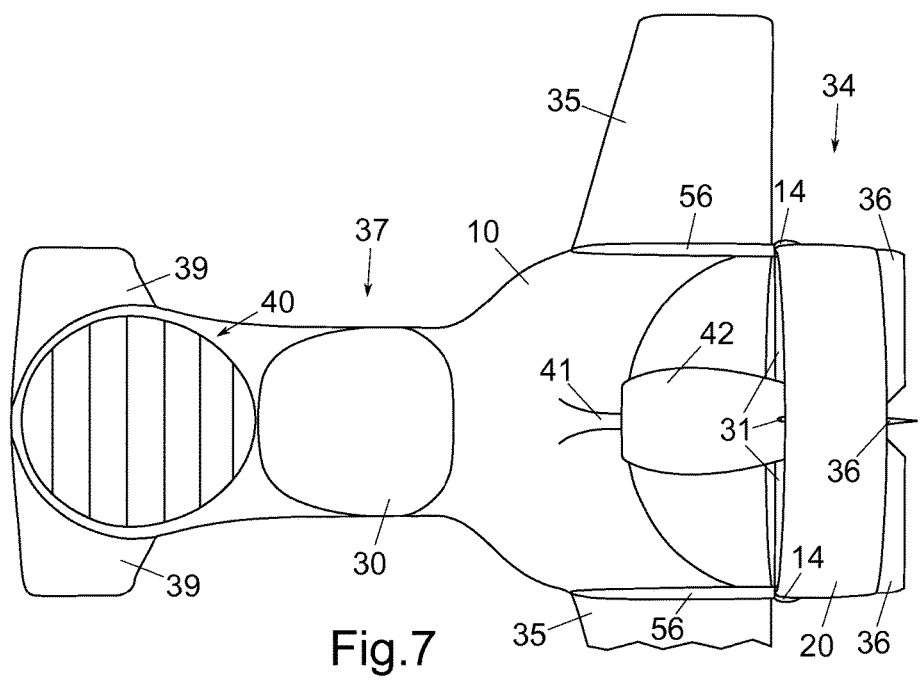
FIG. 7 is a perspective top view of the single lip wing system aircraft configured for horizontal operation.

Another particular embodiment is a V/STOL aircraft, presented in FIG. 6 and FIG. 7. FIG. 6 is showing a perspective view of the aircraft, configured for V/STOL operation.

The aircraft is having a fuselage 37, a bow located auxiliary propeller 38, a stern located lip wing 10, having same parts and properties as described in the first embodiment. The lip wing is blended with the fuselage 37, creating a lifting body, and also having a pair of conventional wings 35, extending the wingspan of the aircraft. The conventional wings 35 are connected to the lip wing 10, using hubs or hinges or rotary joints 56, to allow folding for easier storage or road-ability. The conventional wings 35 extremities are ending in wing-let or wing tip devices 43.

The aircraft is having, at the stern, a main assembly 34, similar to the assembly described in the first embodiment, having a shroud 20, a propeller 11, struts 31 and an engine nacelle 42. The main assembly 34 also includes a plurality of control surfaces 36, rotatable on radial axes, placed in the propeller's 11 slip stream.

The main assembly 34 is connected to the lip wing 10, using a pair of articulations 14. Blended with the fuselage 37, a vertical stabilizer 41 houses an actuator 24, for controlling the pivoting of the main assembly 34.

The auxiliary propeller 38 is covered top and bottom by a plurality of control slats 40, exposing the auxiliary propeller 38, and providing vectored thrust. A pair of canard wings 39 are located on front of the fuselage 37. A canopy 30 provides visibility and access to a cockpit, not shown.

Figure 8:
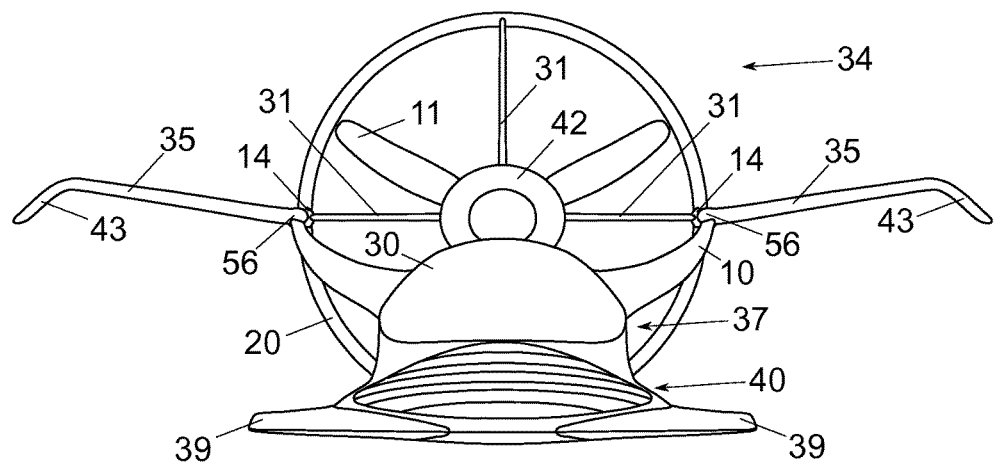
FIG. 8 is a perspective front view of the single lip wing system aircraft configured for horizontal operation.

FIG. 7 shows a top view, and FIG. 8 shows a front view of the V/STOL aircraft configured for horizontal flight.

The main assembly 34 is pivoted, using articulations 14, in a horizontal position, to generate mainly horizontal thrust, for horizontal flight. Visible components, parts of the main assembly 34, are: the shroud 20, the engine nacelle 42, struts 31, on FIG. 7 are visible control surfaces 36, and visible on FIG. 8 is the propeller 11.

The lip wing 10 is generating lift, as well as the conventional wings 35, the left conventional wing, partially shown, is symmetrical to the right conventional wing 35. The hub 56 connects the conventional wings 35 to the lip wing 10, and during horizontal flight, keeping them in the deployed, extended position. The wing-lets 43, visible in FIG. 8, are reducing wing tip loses.

The control slats 40 are covering the auxiliary propeller, not shown, reducing drag. The canard wings 39 provide lift, and are augmenting pitch and roll control. Visible on the fuselage 37 are also the canopy 30 and in FIG. 7, the blended vertical stabilizer 41.

Figure 9:
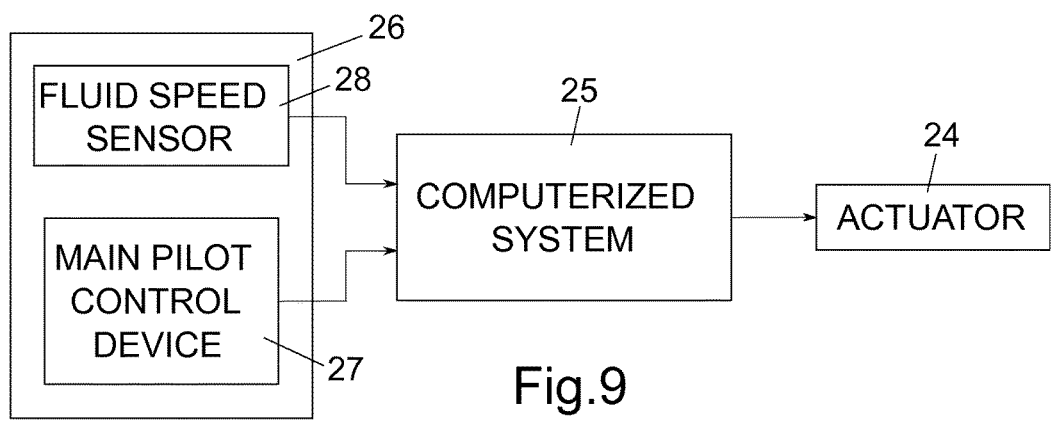
FIG. 9 is a block view of a system for controlling the position of an actuator.

FIG. 9 shows a system for controlling the position of the actuator 24, for pivoting the main assembly, not shown, to a control angle, not shown. A computerized system 25 controls the position of the actuator 24, and is programmed to calculate the control angle, as function of data provided by input devices 26. A fluid speed sensor 28 provides speed information, a main pilot control device 27 provides pilot control input information. Other input devices as gyrosensors and accelerometers, are not shown.

Operation of the Single Lip Wing V/STOL Aircraft

The aircraft configured for VTOL operation, as shown in FIG. 6, is generating vertical aerodynamic forces or lift, using the main assembly 34, the lip wing 10 and the auxiliary propeller 38. The main assembly 34 is pivoted to a position bringing the shroud 20 adjacently to the lip wing 10, augmenting thrust, as described in the first embodiment. The pitch control is provided by differentially controlling the propellers 38 and 11, and by pivoting the main assembly 34, as described in the first embodiment. Roll and yaw control is provided by control surfaces 36, placed in the propeller's 11 slip stream, providing control even at slow or zero speed, and the bottom control slats 40 which are vectoring auxiliary propeller thrust.

As the aircraft speed increases, the conventional wings 35 are starting to provide lift, unloading the main assembly 34, which can be pivoted, as described in the first embodiment, and increasing horizontal thrust, that could be used to more speed increase.

Above a certain speed, the canard wings 39, the lip wing 10 and conventional wings 35 are providing enough lift to balance the weight of the aircraft, the auxiliary propeller 38 is stopped and covered top and bottom by the control slats 40, and the main assembly 34 is placed in a position as shown in FIG. 7 and FIG. 8, generating mainly horizontal thrust, position ensuring reduced drag, as described in the first embodiment.

Pitch and roll control is determined by the canard wings 39 and control surfaces 36. Yaw control is determined by the control surfaces 36. Pivoting the main assembly 34 also could contribute to pitch control, as described in the first embodiment.

Description of a Three Lip Wing V/STOL Aircraft

Another particular embodiment is a V/STOL aircraft, having a system for augmenting thrust and providing yaw, roll, pitch and thrust control, by using three lip wings arranged around the inlet of a shrouded propeller. The aircraft is presented in FIG. 10, FIG. 11 and FIG. 12.

Figure 10:
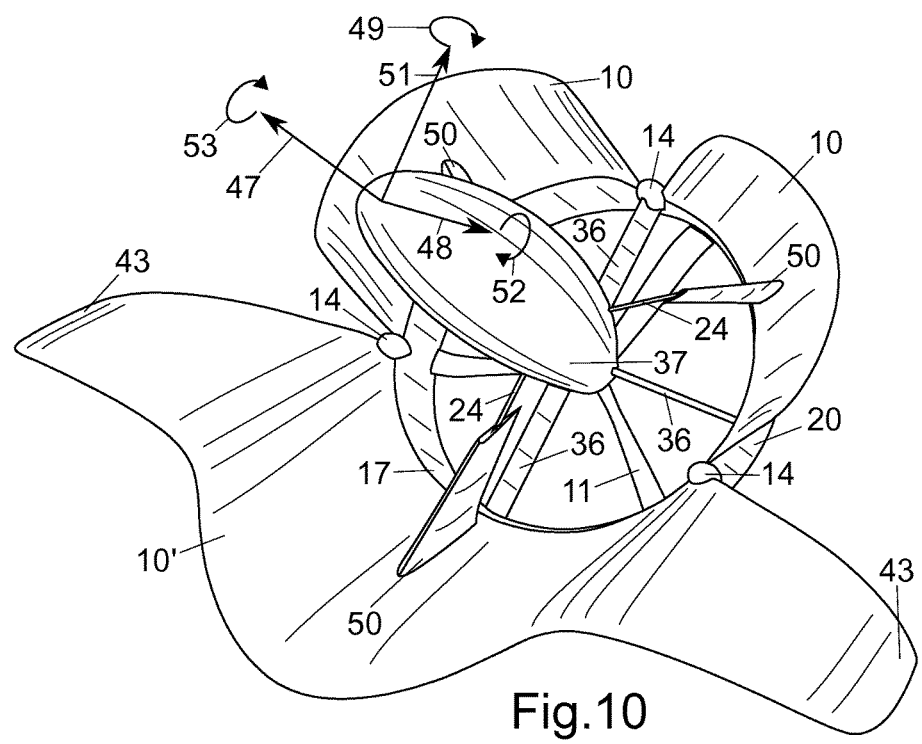
FIG. 10 is a perspective view of an aircraft, having three lip wings, configured for V/STOL operation.

FIG. 10 shows a perspective view of the aircraft configured for VTOL operation. The aircraft is having an extended wingspan, blended wing 10', a central section of the wing forming a lip wing as described in the first embodiment. At extremities, the blended wing 10' is curved, forming wing tip devices or wing-lets 43. The aircraft is having another two regular lip wings 10. All three wings, each of the lip wing 10 and the blended wing 10', are having the same elements, and having the same properties and behaviour as described in the first embodiment. They are independently pivoting on three articulations 14, are arranged around an inlet 17 of a shroud 20.

Each of the lip wing 10 and the blended wing 10, are pivoted adjacent to the inlet 17, forming a VTOL or high thrust position. Attached to the shroud 20 are control surfaces 36, rotatable on radial axes, located in front of a propeller 11. The control surfaces 36 also act as support elements, and are providing support structure to fuselage 37, eliminating the need for separate struts, contributing to reduced drag. Each of the lip wing 10 and the blended wing 10' are having stabilizers 50, housing actuators 24, for controlling independently the position of each of the lip wing 10 and blended wing 10'.

Each of the lip wing 10 and the blended wing 10' are generating aerodynamic forces, not shown, augmenting and increasing thrust, not shown, provided by the propeller 11, as described in the first embodiment. The vector addition of wings 10 and 10' generated aerodynamic forces, and the propeller 11 generated thrust, is a resultant force, not shown, that is vectorialy decomposed on an axial component 47, transversal component 48, and vertical component 51. Varying the lip wings 10, the blended wing 10', and the control surfaces 36, in different combinations, yaw control moment 49, pitch control moment 52, and roll control moment 53 are created.

Figure 11:
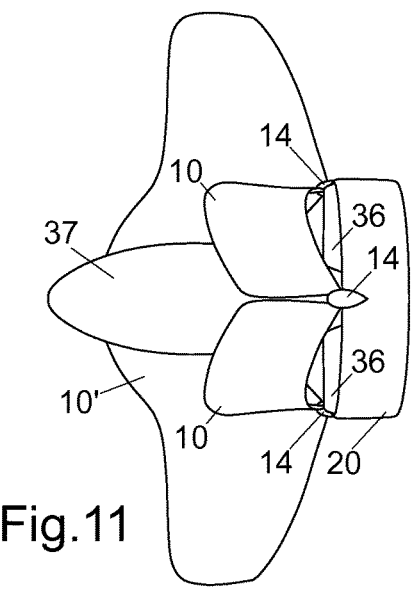
FIG. 11 is a perspective top view of the aircraft, having three lip wings, configured for horizontal operation.
Figure 12:
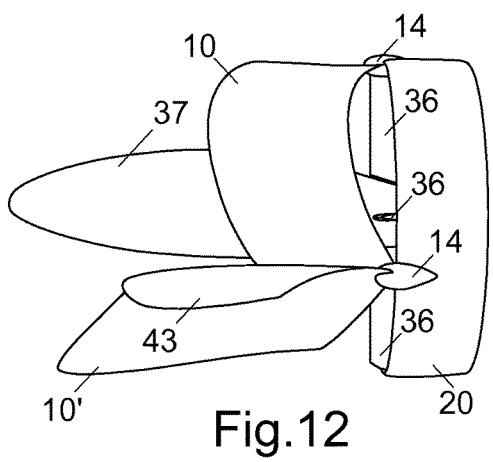
FIG. 12 is a perspective side view of the aircraft, having three lip wings, configured for horizontal operation.

FIG. 11 shows a top view, and FIG. 12 shows a side view of the V/STOL aircraft configured for horizontal flight. The lip wings 10 and the blended wing 10' are pivoted, using the articulations 14, in the horizontal position, approximately parallel to the fuselage 37, reducing drag. The duct 20 and control surfaces 36 provide attitude control and stability to the aircraft. The wing-lets 43 are reducing the blended wing 10' tip loses and are increasing efficiency. The blended wing 10' is swept forward to increase stability provided by the duct 20.

Operation of the Three Lip Wing V/STOL Aircraft

FIG. 10 is presenting the aircraft configured for high thrust and VTOL operation, the lip wings 10, and the lip wing section of the blended wing 10', are pivoted adjacently to the inlet 17 of the shroud 20, increasing the magnitude of the axial component 47, similar as described in the first embodiment. The force components generated by the lip wings 10, and the lip wing section of the blended wing 10', along the direction of the transversal component 48 and the vertical component 51, are cancelling each other.

By pivoting independently each of the lip wing 10 and blended wing 10', the axial component 47, transversal component 48 and the vertical component 51 are modified, generating yaw control moments 49, pitch control moment 52, roll control moment 53, and thrust augmentation control. Roll control moment 53 is augmented, and propeller 11 anti-torque moment, not depicted, is generated by differentially pivoting the control surfaces 36.

As speed increases, the blended wing 10' outer region, the conventional wing section, is generating lift, and allowing the lip wings 10 and the blended wing 10' to be pivoted, to improve lift per drag ratio, as described in the first embodiment. As speed increases more, the process described can be repeated, until the lip wings 10 and the blended wing 10' are in a horizontal position, approximately parallel to the fuselage, as shown in FIG. 11 and FIG. 12, ensuring reduced drag.

Attitude control is provided the same as in VTOL configuration, by pivoting independently each of the lip wing 10 and blended wing 10', by differentially pivoting the control surfaces 36, determining variation in yaw control moment 49, pitch control moment 52 and roll control moment 53.

CONCLUSION, RAMIFICATIONS, AND SCOPE

It will be apparent to those skilled in the art that the invention is applicable to a wide variety of craft design configurations, providing several advantages as: capability to provide efficiently high thrust, to improve acceleration, to provide increased static thrust for watercraft and aircraft, and to improve hovering efficiency for V/STOL aircraft in vertical flight regime. Other objects and advantages are to ensure low drag at increased speed, improve transport efficiency, reduce fuel consumption and allow a smaller installed power for the craft. Other objects and advantages are the ability to provide directional and attitude craft control, reducing or eliminating need for dedicated control surfaces, and to augment and control the propulsion system generated thrust. Other objects and advantages are: reduced cavitation and noise; the wings can act as a pair of rudders; total drag is comparable to a standard propeller and rudder combination; ability of the system to be adjustable, at slow speed creating more thrust, improving acceleration or pull, at high speed having reduced drag and cavitation; the propeller is protected and prevented to hit bottom or foreign objects; ensured ability to easily clean debris from a fouled propeller.

While my above description contains many specificities, these should not be construed as limitations on the scope of the invention, but rather as an exemplification of embodiments thereof. Many other variations are possible. For example an aircraft could be designed with two or more apparatus as described in the first embodiment, enhancing thrust and control, and having increased stability. A particular embodiment example could have the wing and the propulsion system connected using a sliding joint. The lip wing could enhance a variety of propulsion systems, as gas turbines, turbofans, turbojets or any other jet engines or propulsion systems designed to create propulsion force by accelerating fluid.

Accordingly, the scope of the invention should be determined not by the embodiments illustrated, but by the appended claims and their legal equivalents.

What is claimed is:

1. A wing for a craft, said craft having a thrust providing device, having an intake fraction and a device for coupling and adjusting, configured for controlling a relative position of said wing and said thrust providing device, said wing comprised of a wing section having a curvature forming substantially a fore-aft oriented channel, said wing section having a trailing edge, said trailing edge substantially coinciding with said intake fraction, and said trailing edge slanted as to allow adjacent placement, at a predetermined angle, of said thrust providing device, whereby to create a variable fluid-dynamic force, thus providing a craft control and augmenting a propulsion parameter.

2. The wing from claim 1 wherein said thrust providing device includes a propeller, said intake fraction having a circular arc shape, said trailing edge is a circular arc shaped section, and said wing section further including a curvature forming substantially a fore-aft oriented channel.

3. The wing of claim 1 wherein said thrust providing device includes a ducted propeller, said ducted propeller having an inlet, and said wing further including:
   said wing section and said inlet forming substantially a streamlined surface; and
   said wing section having a curvature forming substantially a fore-aft oriented channel.

4. The wing of claim 1 wherein said craft control includes at least one of roll, pitch, yaw and thrust, and said propulsion parameter includes thrust and drag.

5. A device for coupling and adjusting used for altering a control moment and a propulsion parameter of a craft, said craft having a wing, and a thrust providing device, said thrust providing device having an intake, said wing having a trailing edge section, said trailing edge section substantially coinciding with a fraction of said intake, said device for coupling and adjusting comprised of a structure for coupling said wing and said thrust providing device, and means for adjusting relative position of said wing and said thrust providing device.

6. The device for coupling and adjusting of claim 5 wherein said structure for coupling is an articulation for pivotally coupling, and said means for adjusting relative position having a control angle.

7. The device for coupling and adjusting of claim 6 wherein said means for adjusting relative position includes an actuator for moving said wing, and a computerized system configured to control said actuator to vary said control angle so as to modify wing position as a function of data received from an input device, thus controlling said control moment and said propulsion parameter.

8. A system for a craft, comprised of:
   a thrust providing device, having an intake fraction;
   at least a wing, said wing having a wing section, said wing section having a curvature forming substantially a fore-aft oriented channel, said wing section having a trailing edge, said trailing edge substantially coinciding with said intake fraction, said trailing edge slanted to allow adjacent placement, at a predetermined angle, of said wing section and said intake fraction; and
   a device for coupling and adjusting, said device for coupling and adjusting configured to control a relative position of said wing and said thrust providing device;
   whereby said wing generates a variable fluid-dynamic force, thus providing a craft control and augmenting a propulsion parameter.

9. The system of claim 8 wherein said craft control is attitude control and thrust control, and said propulsion parameter includes thrust and drag.

10. The system of claim 9 wherein said device for coupling and adjusting is a device for pivotably coupling and adjusting, said relative position defined by a control angle.

11. The system of claim 10 wherein said craft is a watercraft, said attitude control is yaw control, and further including said device for pivotably coupling and adjusting have an articulation for pivoting said wing on vertical axis.

12. The system of claim 10 further including:
said thrust providing device includes a or duct, said duct having an inlet, said intake fraction includes an inlet fraction of said inlet; and
said wing section and said inlet fraction forming a substantially streamlined surface.

13. The system of claim 12, wherein said device for pivotably coupling and adjusting includes:
an actuator for varying said control angle; and
a computerized system configured to control said actuator to vary said control angle as a function of data received from an input device.

14. A vertical and short takeoff and landing aircraft comprising the system of claim 13 wherein said attitude control includes at least one of yaw, roll and pitch, and said fluid-dynamic force is aerodynamic force.

15. The system of claim 13 wherein said input device includes a main pilot control device and a fluid speed sensor, and said computerized system is configured to also control said control angle as a function of a pilot input and a fluid speed.

16. A vertical and short takeoff and landing aircraft comprising the system of claim 15 wherein said attitude control is pitch, and said fluid-dynamic force is an aerodynamic force.

17. A method for providing a craft control and augmenting a propulsion parameter of a craft having a thrust providing device having an intake fraction, comprising the steps of:
a) providing a wing, said wing having a wing section, said wing section having a curvature forming substantially a fore-aft oriented channel, said wing section having a trailing edge, said trailing edge substantially coinciding with said intake fraction, said trailing edge slanted to allow adjacent placement, at a predetermined angle, of said wing section and said intake fraction, and providing a device for coupling and adjusting, configured to control a relative position of said wing and said thrust providing device; and
b) adjusting said relative position so as to create a variable fluid-dynamic force;
thus providing said craft control and augmenting said propulsion parameter.

18. The method of claim 17 wherein said craft control includes at least one of pitch, roll and yaw, and said propulsion parameter includes thrust and drag.

* * * * *